May 13, 1958 E. A. SIENICKI 2,834,670
PROCESS FOR SEPARATING LEAD AND SODIUM CHLORIDE
Filed June 28, 1955
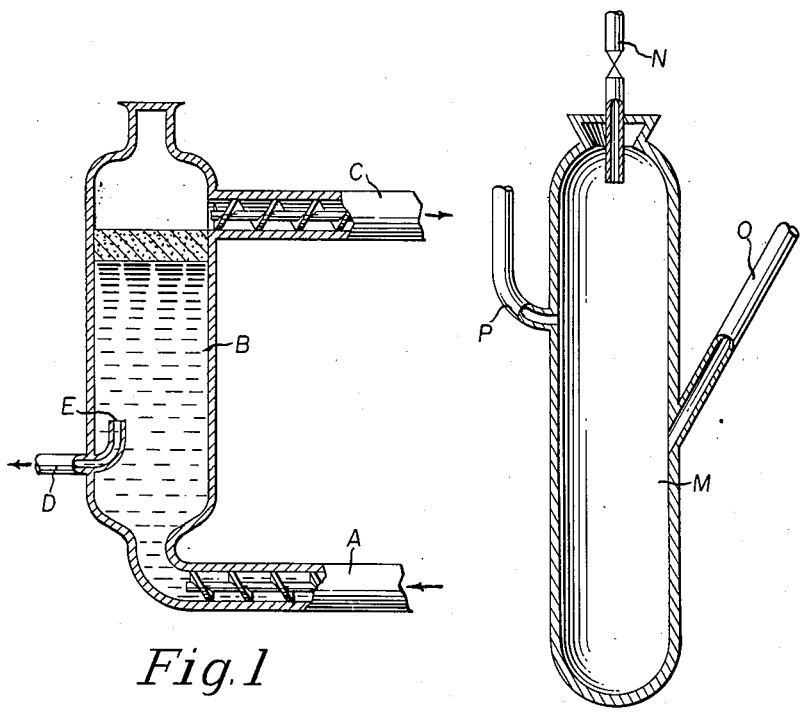
Fig.1
Fig.3
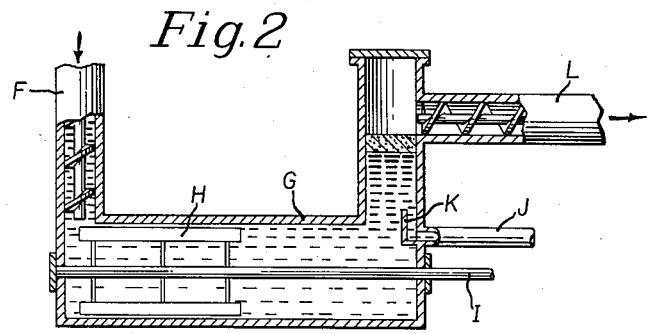
Fig.2
INVENTOR
EDWARD A. SIENICKI
BY
ATTORNEY

United States Patent Office 2,834,670
Patented May 13, 1958

2,834,670

PROCESS FOR SEPARATING LEAD AND SODIUM CHLORIDE

Edward Alexander Sienicki, Wilmington, Del., assignor to E. I. du Pont de Nemours and Company, Wilmington, Del., a corporation of Delaware Application June 28, 1955, Serial No. 518,626

3 Claims. (Cl. 75—78)

This invention is directed to a method for isolating lead and sodium chloride as pure by-products when producing tetraethyllead.

In the process commonly used for making tetraethyllead from ethyl chloride and the sodium-lead alloy, approximately 75% of the lead entering the process in the alloy appears as by-product lead along with sodium chloride according to the following:

$$4NaPb + 4EtCl \rightarrow PbEt_4 + 3Pb + 4NaCl$$

For reasons of economy, it is desirable to recover the lead readily and with little loss; known methods used or proposed for the recovery of the resulting lead fail to achieve this goal in varying degrees. If the tetraethyllead is first removed by steam distillation, the resulting slurry of finely-divided lead in a water solution of salt is hard to handle and tends to agglomerate in large intractable masses unless special precautions are taken. Any unreacted sodium is destroyed by this process. These slurries may be washed by decantation and then dried or compressed into pellets thus removing most of the salt and water. Pure lead is then recovered by melting in a furnace at a high temperature which is required to obtain a separate layer in the presence of the lead oxide and salt which are intimately associated with the finely-divided lead; or, more conveniently, by a process in which the finely-divided lead is readily fused slightly above its melting point by having present a layer of molten sodium hydroxide. When, alternatively, the tetraethyllead is removed from the reaction mass by extraction with an organic solvent, the quantity of salt formed in the reaction must be separated from the lead. In U. S. Patent 2,661,361 to Grandjean, it is proposed to accomplish this separation by fusing at a temperature at which the salt is molten (above 800° C.) and then separating the salt and lead as liquids. Each of these processes has some or all of the following serious disadvantages: high temperature of operation, non-recovery of salt in usable form, loss of metallic sodium, and formation of slag from which lead must be recovered in a separate operation. Thus, it appears that an entirely satisfactory method for recovering lead from the reaction mass in the production of tetraethyllead has not been developed.

It is an object of this invention to provide a significantly improved method for the separation of sodium chloride from intimate mixture with finely-divided unoxidized metallic lead, the latter resulting from the reaction of ethyl chloride with NaPb, by bringing the mixture into intimate contact with an existing mass of molten lead at a temperature within the range of 327 to 800° C. (preferably 400–500° C.) and then allowing the solid sodium chloride to rise and form a granular supernatant layer, the lead being protected from oxidation by utilizing an inert atmosphere free from oxygen and water. Contact between the molten lead and the lead-salt complex may be brought about by any form of mechanical mixing. The salt rises to the surface of the lead and forms a free-flowing granular layer.

It is a further object of this invention to provide a process for the separation of sodium chloride from intimate mixture with metallic lead which is economical and which avoids additional conventional separatory steps required in the prior art in the field of tetraethyllead production.

Contact between the molten lead and the intimate mixture of lead and salt to be separated, is achieved in an embodiment by gradually introducing the mixture into the bottom of a vessel of the molten lead; agitation is required. The lead-salt complex is first vigorously mixed with the molten lead to increase the contact. The agitation is then greatly reduced and the salt, which then rises and forms a separate layer, is removed. Because of the great difference in density between the lead and the salt, the salt rises readily under agitation through the molten lead to form a recoverable supernatant layer.

The inert atmosphere of the present process is most conveniently furnished by oxygen-free nitrogen; however, helium, argon, etc., may also be used.

The present invention is based in part upon the discovery that lead oxide on the surface of molten lead is readily absorbed on the surface of the sodium chloride crystals but that said crystals remain uncontaminated if lead oxide is absent. Accordingly, it is essential that oxygen be prevented from contacting the molten lead. More than traces of lead oxide are objectionable and, in addition to contaminating the salt, said oxide changes the surface characteristics to the extent that it is no longer free-flowing and cannot be readily handled; oxygen must be excluded. It is obvious that oxygen should also be excluded from the lead before it reaches the separation process. Similarly, water must be excluded, since it reacts with lead under certain conditions forming lead oxide. The lead in the present invention must be unoxidized lead.

The salt isolated according to the present invention is usually in the form of a light, granular, free-flowing powder and is suitable for most industrial uses, such as generation of hydrogen chloride to be used in making ethyl chloride for the tetraethyllead process. Similarly the lead recovered is suitable for making sodium lead alloy as the other component of the tetraethyllead process. If any sodium remains unreacted in the reaction with ethyl chloride, it remains with the lead when the sodium chloride is separated and hence is utilized when the recovered lead is made into the alloy, a corresponding smaller quantity of new sodium being required. In other words, an additional advantage of the present invention is that, when unreacted sodium is present in the reaction mass, it is recovered and conserved. On the other hand, in all the methods used for recovering lead from the tetraethyllead reaction mass, all of which use water, the sodium, if present, is destroyed.

The present invention lends itself readily to continuous operation. For example, using apparatus, the main features of which are shown in Figure I, the lead-salt mixture may be introduced by a screw conveyor "A" continuously through a port near the bottom of a nitrogen-blanketed vessel "B," maintained at 400° C., containing the molten lead under agitation (not shown) and the granular mass of salt separated at the top may be withdrawn through screw conveyor "C," while a stream of molten lead, equivalent to the lead being introduced in the lead-salt mixture, is withdrawn through an outlet "D" at a point below the level of the molten lead, provided with a baffle "E" for preventing the entrance of salt. The entire system is filled with an inert gas, such as nitrogen, to prevent oxidation of the charge.

In another form of continuous operation, shown in Figure II, the lead-salt mixture is introduced by means of a screw conveyor "F" downward into the inlet end of a horizontal cylinder "G" filled with molten lead. As the mixture enters the cylinder "G" from the conveyor "F"

it is caught by the paddles of an agitator "H" and is mixed with the molten lead. This agitator, composed of a series of flat peripheral paddles located in the inlet end of the cylinder "G" for mixing the lead-salt mixture into the molten lead and smaller blades in the outlet end for gently stirring the mass, rotates with shaft "I" which runs through the axis of the cylinder. As more lead-salt mixture is introduced, the agitated mass containing excess lead is moved along the cylinder away from the inlet and finally into the less agitated part of the cylinder, where separation into liquid lead and granular salt layers takes place. The lead is removed through outlet "J" provided with a baffle "K" as in apparatus of Figure I, while the salt is likewise removed by the conveyor "L."

*Example*

The reaction mass to be treated was prepared by ethylation of NaPb with an excess of ethyl chloride. All the organic material was then extracted with liquid ethyl chloride. All operations were carried out substantially without exposure to oxygen or water. Five parts, by weight, of this reaction mass, consisting essentially of an intimate mixture of lead and sodium chloride, was introduced into the bottom of a glass tube "M," Figure III, at 400° C., and blanketed under nitrogen which was introduced through the inlet "O." A manipulating tube "N" provided an outlet for the gas as well as means for introducing and using stirrers, ladles, and the like and for adding and removing materials. Molten lead, 100 parts, was introduced into "M" through another inlet "P," which remained closed except when the lead was being introduced or the system was being flushed with nitrogen. The charge in "M" was agitated by means of a long narrow steel blade introduced through "N." The sodium chloride content collected in a supernatant, granular layer on the surface of the molten lead, while all of the lead from the reaction mass remained in the molten layer. The sodium chloride layer was loose and free-flowing and could be readily ladled out.

I claim:

1. In the process of separating sodium chloride from an intimate mixture with finely divided unoxidized metallic lead, said lead resulting from the reaction of ethyl chloride with NaPb, the improvement which comprises intimately mixing said mixture by conventional agitating means with a mass of unoxidized molten lead maintained at a temperature within the range of 327 to 800° C., said mixing being conducted under inert atmospheric conditions followed by allowing the solid sodium chloride to rise through said molten lead to form a granular supernatant layer of said sodium chloride in an inert atmosphere, said process being conducted under anhydrous conditions, said process resulting in substantially complete separation of said sodium chloride and said unoxidized lead.

2. The method of claim 1 wherein the mass of molten lead is maintained at a temperature within the range of 400–500° C.

3. The method of claim 1 in which the inert atmosphere is nitrogen.

References Cited in the file of this patent

UNITED STATES PATENTS

| | | |
|---|---|---|
| 905,948 | Stromborg | Dec. 8, 1908 |
| 969,253 | Diack | Sept. 6, 1910 |
| 2,488,447 | Langen et al. | Nov. 15, 1949 |
| 2,493,391 | Chew | Jan. 3, 1950 |
| 2,765,328 | Padgitt | Oct. 2, 1956 |

FOREIGN PATENTS

| | | |
|---|---|---|
| 479,777 | Great Britain | Feb. 11, 1938 |